United States Patent
Gnanasambandam et al.

(10) Patent No.: US 8,215,548 B2
(45) Date of Patent: Jul. 10, 2012

(54) METHOD AND SYSTEM FOR PROVIDING CONTRACT-FREE "PAY-AS-YOU-GO" OPTIONS FOR UTILIZATION OF MULTI-FUNCTION DEVICES

(75) Inventors: Shanmuga-nathan Gnanasambandam, Webster, NY (US); Warren Kleiman, Fairport, NY (US); Jack Douglas Jenkins, Jr., Tualatin, OR (US); Dennis C. DeYoung, Webster, NY (US); Russell Neville, Tualatin, OR (US); Ashok Murthy, Tualatin, OR (US)

(73) Assignee: Xerox Corporation, Nowalk, CT (US)

( * ) Notice: Subject to any disclaimer, the term of this patent is extended or adjusted under 35 U.S.C. 154(b) by 326 days.

(21) Appl. No.: 12/424,820

(22) Filed: Apr. 16, 2009

(65) Prior Publication Data

US 2010/0264214 A1    Oct. 21, 2010

(51) Int. Cl.
    *G06K 15/00* (2006.01)
(52) U.S. Cl. ........ 235/383; 235/375; 235/380; 235/382; 235/385
(58) Field of Classification Search ............... 235/375, 235/383, 385, 380, 382
    See application file for complete search history.

(56) References Cited

U.S. PATENT DOCUMENTS

| | | | |
|---|---|---|---|
| 5,146,344 A * | 9/1992 | Bennett et al. | 358/296 |
| 5,563,999 A | 10/1996 | Yaksich et al. | |
| 6,076,076 A | 6/2000 | Gottfreid | |
| 6,202,155 B1 * | 3/2001 | Tushie et al. | 726/20 |
| 6,357,942 B1 | 3/2002 | Adkins et al. | |
| 6,373,587 B1 | 4/2002 | Sansone | |
| 6,452,512 B1 | 9/2002 | Adkins et al. | |
| 6,471,319 B1 | 10/2002 | Adkins et al. | |
| 6,523,924 B1 | 2/2003 | Adkins et al. | |
| 6,525,837 B1 | 2/2003 | Adkins et al. | |
| 6,567,015 B2 | 5/2003 | Adkins et al. | |
| 6,600,150 B1 | 7/2003 | Adkins et al. | |

(Continued)

FOREIGN PATENT DOCUMENTS

JP    2002215374    8/2002

(Continued)

OTHER PUBLICATIONS

"Pay per Click." *Wikipedia, the Free Encyclopedia*. Apr. 7, 2009. Web. Jan. 11, 2011. <http://en.wikipedia.org/wiki/Pay_per_click>.

(Continued)

*Primary Examiner* — Ali Sharifzada
(74) *Attorney, Agent, or Firm* — Fay Sharpe LLP

(57) ABSTRACT

A method and system including a plurality of multifunctional devices being operatively associated with at least one controller and each having a preset amount of preloaded consumables at a time of initial use; and a software application for enabling at least one user to access the plurality of multifunctional devices, the software application being configured to receive information from a prepaid card, the information including a financial value relating to usage of some of the preset amount of preloaded consumables in the plurality of multifunctional devices; wherein the financial value of the prepaid card is applied by the at least one user across the plurality of multifunctional devices in any desired uniform or non-uniform financial proportions in accordance with usage determinations; and wherein the at least one user is enabled to pay for access to the plurality of multifunctional devices in time staggered installments without pre-established contractual obligations.

30 Claims, 5 Drawing Sheets

U.S. PATENT DOCUMENTS

| | | | |
|---|---|---|---|
| 6,600,151 B2 | 7/2003 | Chapman et al. |
| 6,609,781 B2 | 8/2003 | Adkins et al. |
| 6,616,261 B2 | 9/2003 | Adkins et al. |
| 6,624,407 B1 | 9/2003 | Adkins et al. |
| 6,626,513 B2 | 9/2003 | Adkins et al. |
| 6,631,971 B2 | 10/2003 | Adkins et al. |
| 6,637,961 B1 | 10/2003 | Adkins et al. |
| 6,655,777 B2 | 12/2003 | Adkins et al. |
| 6,660,996 B1 | 12/2003 | Adkins et al. |
| 6,763,336 B1 | 7/2004 | Kolls |
| 6,768,427 B1 | 7/2004 | Adkins et al. |
| 6,768,558 B1 | 7/2004 | Yamashita et al. |
| 6,823,133 B1 | 11/2004 | Adkins et al. |
| 6,830,399 B2 | 12/2004 | Adkins et al. |
| 6,843,547 B2 | 1/2005 | Adkins et al. |
| 6,865,241 B1 | 3/2005 | Adkins et al. |
| 6,871,926 B2 | 3/2005 | Adkins et al. |
| 6,873,424 B2 | 3/2005 | Jakobsson et al. |
| 6,917,440 B2 | 7/2005 | Kondo |
| 6,940,613 B1 | 9/2005 | Beard et al. |
| 6,940,913 B2 | 9/2005 | Verbin et al. |
| 6,957,921 B1 | 10/2005 | Silverbrook et al. |
| 6,963,820 B2 | 11/2005 | Adkins et al. |
| 6,976,798 B2 | 12/2005 | Keane et al. |
| 7,050,726 B2 | 5/2006 | Adkins et al. |
| 7,134,594 B2 | 11/2006 | Thompson et al. |
| 7,146,114 B2 | 12/2006 | Frankel et al. |
| 7,163,273 B2 | 1/2007 | Silverbrook |
| 7,216,951 B2 | 5/2007 | Garrana et al. |
| 7,240,995 B2 | 7/2007 | Adkins et al. |
| 7,280,772 B2 | 10/2007 | Adkins et al. |
| 7,369,782 B2 | 5/2008 | Adkins et al. |
| 7,376,627 B2 | 5/2008 | Adkins et al. |
| 7,430,605 B2 | 9/2008 | Quach et al. |
| 7,469,107 B2 | 12/2008 | Adkins et al. |
| 7,585,043 B2 | 9/2009 | Adkins et al. |
| 7,589,850 B2 | 9/2009 | Adkins et al. |
| 7,689,513 B2 | 3/2010 | Adkins et al. |
| 7,739,198 B2 | 6/2010 | Adkins et al. |
| 7,788,490 B2 | 8/2010 | Adkins et al. |
| 7,792,992 B2 | 9/2010 | Gnanasambandam et al. |
| 7,798,594 B2 | 9/2010 | Adkins et al. |
| 7,859,412 B2 | 12/2010 | Kothari et al. |
| 2002/0039193 A1* | 4/2002 | Kondo et al. ............... 358/1.14 |
| 2002/0049638 A1 | 4/2002 | Ito |
| 2002/0073002 A1 | 6/2002 | Horii et al. |
| 2002/0131079 A1 | 9/2002 | Forbes et al. |
| 2002/0135624 A1 | 9/2002 | Naka et al. |
| 2002/0194064 A1 | 12/2002 | Parry et al. |
| 2003/0090705 A1 | 5/2003 | Ferlitsch |
| 2003/0098993 A1* | 5/2003 | Ohara ............... 358/1.15 |
| 2003/0115156 A1 | 6/2003 | Baker |
| 2003/0137549 A1 | 7/2003 | Adkins et al. |
| 2003/0151766 A1 | 8/2003 | Cherry et al. |
| 2004/0008371 A1 | 1/2004 | Keane et al. |
| 2004/0012644 A1 | 1/2004 | Allen et al. |
| 2004/0125397 A1 | 7/2004 | Adkins et al. |
| 2004/0153415 A1 | 8/2004 | Adkins et al. |
| 2004/0179885 A1 | 9/2004 | Adkins et al. |
| 2004/0190014 A1 | 9/2004 | Ferlitsh |
| 2004/0207668 A1 | 10/2004 | Adkins et al. |
| 2004/0215577 A1 | 10/2004 | Mitsuda |
| 2004/0236705 A1 | 11/2004 | Shima et al. |
| 2004/0249733 A1 | 12/2004 | Clough et al. |
| 2005/0091343 A1 | 4/2005 | Murray, Jr. |
| 2005/0206672 A1 | 9/2005 | Adkins et al. |
| 2005/0273403 A1 | 12/2005 | Nguyen et al. |
| 2005/0286913 A1 | 12/2005 | Adkins et al. |
| 2006/0004672 A1* | 1/2006 | Leute ............... 705/66 |
| 2006/0020561 A1 | 1/2006 | Kodimer et al. |
| 2006/0044590 A1 | 3/2006 | Ferlitsch et al. |
| 2006/0056856 A1 | 3/2006 | Adkins et al. |
| 2006/0065715 A1 | 3/2006 | Kojima et al. |
| 2006/0069647 A1 | 3/2006 | Cozian et al. |
| 2006/0095280 A1* | 5/2006 | Gooding ............... 705/1 |
| 2006/0120735 A1 | 6/2006 | Adkins et al. |
| 2006/0140647 A1 | 6/2006 | Adkins et al. |
| 2006/0190324 A1 | 8/2006 | Adkins et al. |
| 2006/0200735 A1 | 9/2006 | Ormond |
| 2006/0224889 A1 | 10/2006 | Adkins et al. |
| 2006/0233562 A1 | 10/2006 | Zwiefelhofer |
| 2006/0259983 A1 | 11/2006 | Sperry |
| 2006/0290973 A1 | 12/2006 | Inouye et al. |
| 2007/0027990 A1 | 2/2007 | Nakaoka et al. |
| 2007/0035762 A1 | 2/2007 | Wilsher et al. |
| 2007/0035763 A1 | 2/2007 | Bard et al. |
| 2007/0057982 A1 | 3/2007 | Adkins et al. |
| 2007/0061268 A1 | 3/2007 | Herold et al. |
| 2007/0075137 A1 | 4/2007 | Adkins et al. |
| 2007/0077074 A1 | 4/2007 | Adkins et al. |
| 2007/0079125 A1 | 4/2007 | Adkins et al. |
| 2007/0088613 A1 | 4/2007 | Adkins et al. |
| 2007/0094148 A1 | 4/2007 | Adkins et al. |
| 2007/0156523 A1 | 7/2007 | Liu et al. |
| 2007/0174218 A1 | 7/2007 | Kojima et al. |
| 2007/0182984 A1 | 8/2007 | Ragnet |
| 2007/0188530 A1 | 8/2007 | Garrana et al. |
| 2008/0010211 A1 | 1/2008 | Ferraro |
| 2008/0027875 A1 | 1/2008 | Adkins et al. |
| 2008/0065477 A1 | 3/2008 | Korhonen |
| 2008/0071626 A1 | 3/2008 | Hill |
| 2008/0079989 A1* | 4/2008 | Agnetta et al. ............... 358/1.15 |
| 2008/0181622 A1 | 7/2008 | Adkins et al. |
| 2008/0183630 A1 | 7/2008 | Stephenson |
| 2008/0186187 A1 | 8/2008 | Adkins et al. |
| 2008/0186367 A1 | 8/2008 | Adkins et al. |
| 2008/0319845 A1 | 12/2008 | Adkins et al. |
| 2009/0006247 A1 | 1/2009 | Hansen et al. |
| 2009/0066985 A1 | 3/2009 | Ferlitsch |
| 2009/0070243 A1 | 3/2009 | Buck et al. |
| 2009/0070276 A1 | 3/2009 | Kodimer et al. |
| 2009/0147299 A1* | 6/2009 | Tetu ............... 358/1.15 |
| 2009/0192910 A9 | 7/2009 | Rankin et al. |
| 2009/0248578 A1 | 10/2009 | Pollock et al. |
| 2010/0039669 A1 | 2/2010 | Chang et al. |
| 2010/0088178 A1 | 4/2010 | Gnanasambandam et al. |
| 2010/0088201 A1 | 4/2010 | Nagarajan et al. |
| 2010/0097626 A1 | 4/2010 | Moore et al. |
| 2010/0196075 A1 | 8/2010 | Tredoux et al. |
| 2010/0264214 A1 | 10/2010 | Gnanasambandam et al. |
| 2011/0011929 A1 | 1/2011 | Padua et al. |

FOREIGN PATENT DOCUMENTS

| | | |
|---|---|---|
| WO | 0102946 A1 | 1/2001 |

OTHER PUBLICATIONS

"Pay per Click." *Wikipedia, the Free Encyclopedia*. Jan. 31, 2009. Web. Jan. 11, 2011. <http://en.wikipedia.org/wiki/Pay_per_click>.
"Pay per Click." *Wikipedia, the Free Encyclopedia*. Oct. 3, 2008. Web. Jan. 11, 2011. <http://en.wikipedia.org/wiki/Pay_per_click>.
"Pay per Click", Wikipedia, the Free Encyclopedia, Oct. 3, 2008, Web, Jan. 11, 2011, http://en.wikipedia.org/wiki/Pay_per_click.
"Pay per Click", Wikipedia, the Free Encyclopedia, Apr. 7, 2009, web, Jan. 11, 2011, http://en.wikipedia.org/wiki/Pay_per_click.
"Pay per Click", Wikipedia, the Free Encyclopedia, Jan. 31, 2009, web, Jan. 11, 2011, http://en.wikipedia.org/wiki/Pay_per_click.
U.S. Appl. No. 12/364,224, filed Aug. 5, 2010, Tredoux et al.
U.S. Appl. No. 12/424,820, filed Oct. 21, 2010, Gnanasambandam et al.
U.S. Appl. No. 12/424,858, filed Oct. 21, 2010, Gnanasambandam et al.
GB Search Report, May 24, 2011.

* cited by examiner

METHOD AND SYSTEM FOR PROVIDING CONTRACT-FREE "PAY-AS-YOU-GO" OPTIONS FOR UTILIZATION OF MULTI-FUNCTION DEVICES

CROSS-REFERENCE TO RELATED APPLICATION

This application is related to U.S. patent application entitled "SYSTEM AND METHOD FOR SELECTIVELY CONTROLLING THE USE OF FUNCTIONALITY IN ONE OR MORE MULTIFUNCTION DEVICES AND SUBSIDIZING THEIR USE THROUGH ADVERTISEMENTS" filed simultaneously herewith, which is incorporated by reference herein in its entirety.

BACKGROUND

1. Field of the Related Art

The present disclosure relates to document processing systems, such as printing systems, and more particularly, to a method and system for enabling document processing services (including printing) on a plurality of multifunction devices (MFDs) by utilizing a contract-free "pay-as-you-go" system.

2. Background of the Related Art

The concept of "network printing," in which any of a plurality of computers submit digital data to one of any number of printers over a network, is well known. A conventional printing system uses a client/server architecture that usually includes three primary components. These components include (i) a client, (ii) a server, and (iii) an output device. The client conveys print and management requests to the server and receives responses from the server that arise in response to the submitted requests. The server receives these requests from the client, performs the required actions for each request, and returns the responses to the client. One such request from a client is a print request, i.e., a request to print one or more copies of one or more documents, with the printed pages output using one or more features. A print request may represent a collection of one or more documents to be printed, as well as instructions for printing. The server organizes the documents indicated in the print request submitted by the client into a print job. The server then sends the print job and any associated job control commands to an output device.

The output device is a physical device, or hardware, that is capable of rendering images of documents and producing hard copy output of the print jobs received from the server. The output device can then return responses to the server regarding its current state or the status of the received print jobs. The output device is commonly a printer. However, the output device may also be any type of multifunction device (MFD).

In general, a MFD operates as a plurality of different imaging devices, including, but not limited to, a printer, copier, fax machine, and/or scanner. In recent years the basic office copier has evolved into what can be referred to as a MFD. With digital technology, a machine with the basic outward appearance of a traditional copier can perform at least the additional functions of printing documents submitted in digital form over a network, sending and receiving messages via facsimile, recording hard-copy original images in digital form and sending the resulting data over a network, such as in electronic mail and/or recording hard-copy original images in digital form on a compact disc or equivalent medium.

In the area of digital printing and copying, there has been a growth in demand for MFDs. Such MFD devices may assume the form of an arrangement in which a single print engine (e.g., xerographic or thermal ink jet print engine) is coupled with a plurality of different image input devices (or "services"), with such devices being adapted to produce image related information for use by the printer or transmitted over a network. The image related information, in one example, could have its origin in video facsimile signals, microfilm, data processing information, light scanning platens for full size documents, aperture cards, and microfiche. MFDs provide a broader range of functionality than traditional single-function devices, such as dedicated printers, copiers, and scanners. As a result, since MFDs are universally used, and since many MFDs can be quite pricey for consumers/customers, it would be useful to enable several users of various economic means to have access to such expensive MFDs on a "pay-as-you-go" basis.

For example, in today's networking environments, long-term contractual agreements and high upfront costs have made some print devices, including MFDs, economically out of reach for several customers. In conventional systems, there is no mechanism to pay low, flexible amounts of money that may depend on seasonal print/usage volume without contractual obligations. Moreover, shipping delays are prevalent when a consumable has to be replenished by a customer for a single MFD or a multitude of MFDs that belong to a fleet of MFDs. Even for a small shipment size there may be a need for the consumer to transport the consumable to the MFD involving a delay. Thus, in networked environments employing a large number of MFDs, it is more economical to operate MFDs on a "pay-as-you-go" basis.

Consequently, current systems lack the capability to effectively provide for cheap or economical solutions for customers desiring to use one or more MFDs that may have seasonal demand cycles. The present disclosure is intended to overcome the drawbacks of other methods by providing for a system and method for enabling printing on a plurality of MFDs by utilizing a contract-free "pay-as-you-go" system.

SUMMARY

The present disclosure provides a system including a plurality of multifunctional devices, said plurality of multifunctional devices being operatively associated with at least one controller and each one of said plurality of multifunctional devices having a preset amount of preloaded consumables at a time of initial use; and a software application for enabling at least one user to access said plurality of multifunctional devices, said software application being configured to receive information from a prepaid card, the information including a financial value relating to usage of some of the preset amount of preloaded consumables in said plurality of multifunctional devices, and the prepaid card being used (i) for activating said software application and (ii) for selectively authorizing access of the at least one user to the at least one controller of said plurality of multifunctional devices; wherein the financial value of the prepaid card is applied by the at least one user across said plurality of multifunctional printing devices in any desired uniform or non-uniform financial proportions in accordance with usage determinations of the at least one user; and wherein the at least one user is enabled, through use of the prepaid card, to pay for access to said plurality of multifunctional devices in time staggered installments without pre-established contractual obligations.

The present disclosure also provides a method for enabling printing capabilities, the method including enabling a plurality of multifunctional devices to be operatively associated with at least one controller where each one of said plurality of multifunctional devices includes a preset amount of preloaded consumables at a time of initial use; and enabling at least one user to access said plurality of multifunctional devices via a software application, said software application being configured to receive information from a prepaid card, the information including a financial value relating to usage of some of the preset amount of preloaded consumables in said plurality of multifunctional devices, and the prepaid card being used (i) for activating said software application and (ii) for selectively authorizing access of the at least one user to the at least one controller of said plurality of multifunctional devices; wherein the financial value of the prepaid card is applied by the at least one user across said plurality of multifunctional printing devices in any desired uniform or non-uniform financial proportions in accordance with usage determinations of the at least one user; and wherein the at least one user is enabled, through use of the prepaid card, to pay for access to said plurality of multifunctional devices in time staggered installments without pre-established contractual obligations.

The present disclosure also provides a computer-readable medium which stores programmable instructions configured for being executed by at least one processor for performing the methods described herein according to the present disclosure. The computer-readable medium can include flash memory, CD-ROM, a hard drive, etc.

BRIEF DESCRIPTION OF THE DRAWINGS

Various embodiments of the present disclosure will be described herein below with reference to the figures wherein.

DETAILED DESCRIPTION

Figure 1:
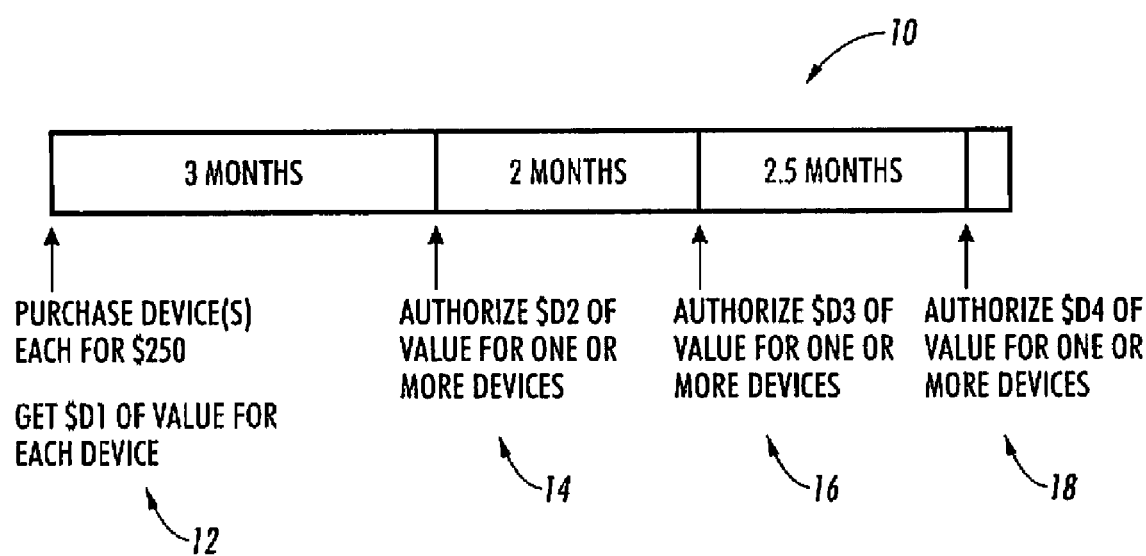
FIG. 1 is a schematic diagram of a flexible and incremental payment process of the "pay-as-you-go" purchase system of FIG. 2, in accordance with the present disclosure.

The present disclosure proposes a system and method for enabling printing on a single MFD or a plurality of MFDs (i.e., a fleet of MFDs) while securely paying for the printing through flexible, small installments at a time of the customers' choosing. In addition, shipping delays associated with consumables may be reduced or even entirely eliminated by the exemplary embodiments of the present disclosure.

The present disclosure further proposes that at the time of initial purchase of the MFDs, a reasonable amount of consumables, such as toner or any other type of consumable(s) related to MFDs, are shipped along with the initial shipment of each MFD of the plurality of MFDs at no additional cost to either the manufacturer or the purchaser of the MFDs. The amount of consumables may be such that it is enough to enable printing through the estimated lifetime of the printer for, say, 95% of the customers for that specific MFD type.

The present disclosure further proposes that without explicit authorization from the manufacturer (e.g., Xerox® or any other service provider or any other controller of the plurality of MFDs) the MFDs would not print or perform any other type of operation (such as scanning, faxing, etc). In other words, constant and continuous authorization is required for the usage of the MFDs by the users of the plurality of MFDs from the controller/operator/owner and/or service provider of the plurality of MFDs.

The present disclosure further proposes that the authorization can be applied to a multitude of MFDs at the customer's end via a manufacturer supplied software application that will accept a code, say, from a "value-card" like entity to hold a selected financial value relating to consumables. The consumer may buy the "value-card" through any conventional means (e.g., physical or electronic) and, as such, the modality of purchase does not affect the exemplary embodiment of the present disclosure.

The present disclosure further proposes that a page counter that counts down using actual printed volume by pages or page coverage by pixels deposited is used to measure usage. The page-counter can be securely incremented whenever a payment is authorized. A life-time counter may also be maintained within the controller, which is decremented by the same amount the page-counter is incremented at the time of payment authorization.

The term "print" is overloaded to mean sending the document to the printer through any one of a multitude of ways. Moreover, the term "printer" can refer to any device that accepts text and graphic output from any type of computing device and transfers the information to any printable medium. A "printer" can refer to any type of xerographic, solid ink, liquid ink, cut sheet or web-based device used to print onto a wide array of printable media. The term "printer" as used herein encompasses any apparatus, such as a digital copier, bookmaking machine, facsimile machine, multi-function machine, etc. which performs a print outputting function for any purpose.

MFDs disclosed herein include both those that are "connected" and those that are "unconnected." An "unconnected" MFD does not have access to a network (e.g., the Internet). A "connected" MFD is normally connected via an Ethernet card or the like to a network. In the present embodiments, the MFD may be an unconnected MFD that is in operative communication with a wireless device, the wireless device being able to access a network. A connection between the multifunctional device and the wireless device is made through a two-way communication channel located on the multifunctional device.

The term "MFD" can refer to any machine that connects to either a computing device and/or network and performs one or more of the following functions: print, scan, copy, and/or fax. Digital copiers, fax machines, printers, and scanner combinations are all examples of MFDs. The term "MFD" can further refer to any hardware that combines several functions in one unit. For instance, an MFD can be a standalone printer or any type of standalone machine/device/apparatus/component. For example, an MFD can be one or more personal computers (PCs), a standalone printer, a standalone scanner, a mobile phone, an MP3 player, audio electronics, video electronics, GPS systems, televisions, recording and/or reproducing media (such as CDs, DVDs, camcorders, cameras, etc.) or any other type of consumer or non-consumer analog and/or digital electronics. Such consumer and/or non-consumer electronics can apply in any type of entertainment, communications, home, and/or office capacity. Thus, the term "MFDs" can refer to any type of electronics suitable for use with a circuit board and intended to be used by a plurality of individuals for a variety of purposes.

The term "storage" can refer to data storage. "Data storage" can refer to any article or material (e.g., a hard disk) from which information is capable of being reproduced, with or without the aid of any other article or device. "Data storage" can refer to the holding of data in an electromagnetic form for access by a computer processor. Primary storage is data in random access memory (RAM) and other "built-in" devices. Secondary storage is data on hard disk, tapes, and other external devices. "Data storage" can also refer to the permanent holding place for digital data, until purposely erased. "Storage" implies a repository that retains its content without power. "Storage" mostly means magnetic disks, magnetic tapes and optical discs (CD, DVD, etc.). "Storage" may also refer to non-volatile memory chips such as flash, Read-Only memory (ROM) and/or Electrically Erasable Programmable Read-Only Memory (EEPROM).

The term "software application" can refer to any type of tool that functions and is operated by means of a computing device/component, with the purpose of supporting or improving the software user's work/tasks. The term "software application" can also refer to a subclass of computer software that employs the capabilities of a computer directly and thoroughly to a task that the user wishes to perform. The term "software application" can further refer to a program or group of programs designed for end users. Application software can include any type of database programs, word processing programs, and/or spreadsheet programs.

The term "activating element" can refer to a prepaid card. The term "activating element" may refer to pieces of paper marked in various ways and used for conducting financial and/or business transactions and/or a piece of plastic of any size that serves as the physical platform for such technologies as bar codes, micro chips, and magnetic stripes. The term "activating element" may further refer to any small, high capacity, high-security flash memory card that provides data storage and Input/Output (I/O) access in a variety of electronic devices.

The term "pay-as-you-go" may refer to a time-periodic payment, such as daily weekly, monthly, bimonthly, quarterly, etc. payment(s). The fee could be a fixed fee or an adjustable fee based on the number of pages printed or based on user operations. Thus, the fee could be a changeable fee based on use or any other desirable parameter(s). The term "pay-as-you-go" may also refer to a system or practice of paying debts as they are incurred. The term "pay-as-you-go" may also refer to a type of service subscription which allows MFD owners/operators/controllers to pay in advance for print jobs or pay for print jobs printed on a time-periodic basis, and add more funds as needed, by day, week or month. Of course, the "pay-as-you-go" system is not limited to print jobs. It may apply to any user tasks/operations, such as, but not limited to, scanning, faxing, etc. The "pay-as-you-go" services may require no contract and no sign-up fees.

The term "virtual" refers to existing in essence or effect though not in actual fact and/or not concrete or physical. The term "virtual" may also refer to something (such as an entity or an item) that has no physical basis itself but mimics a physical object in conceptual terms and/or something occurring or existing primarily on the Internet, such as a virtual card. The term "virtual card" may refer to a credit/debit/payment card that generates a virtual card number each time a user makes a transaction online so that the user doesn't have to use his/her personal debit or credit card number. In this context, a "virtual card" may refer to one or more numbers used across a fleet of MFDs for repurchasing, for example, consumables.

Embodiments will be described below while referencing the accompanying figures. The accompanying figures are merely examples and are not intended to limit the scope of the present disclosure.

Figure 2:
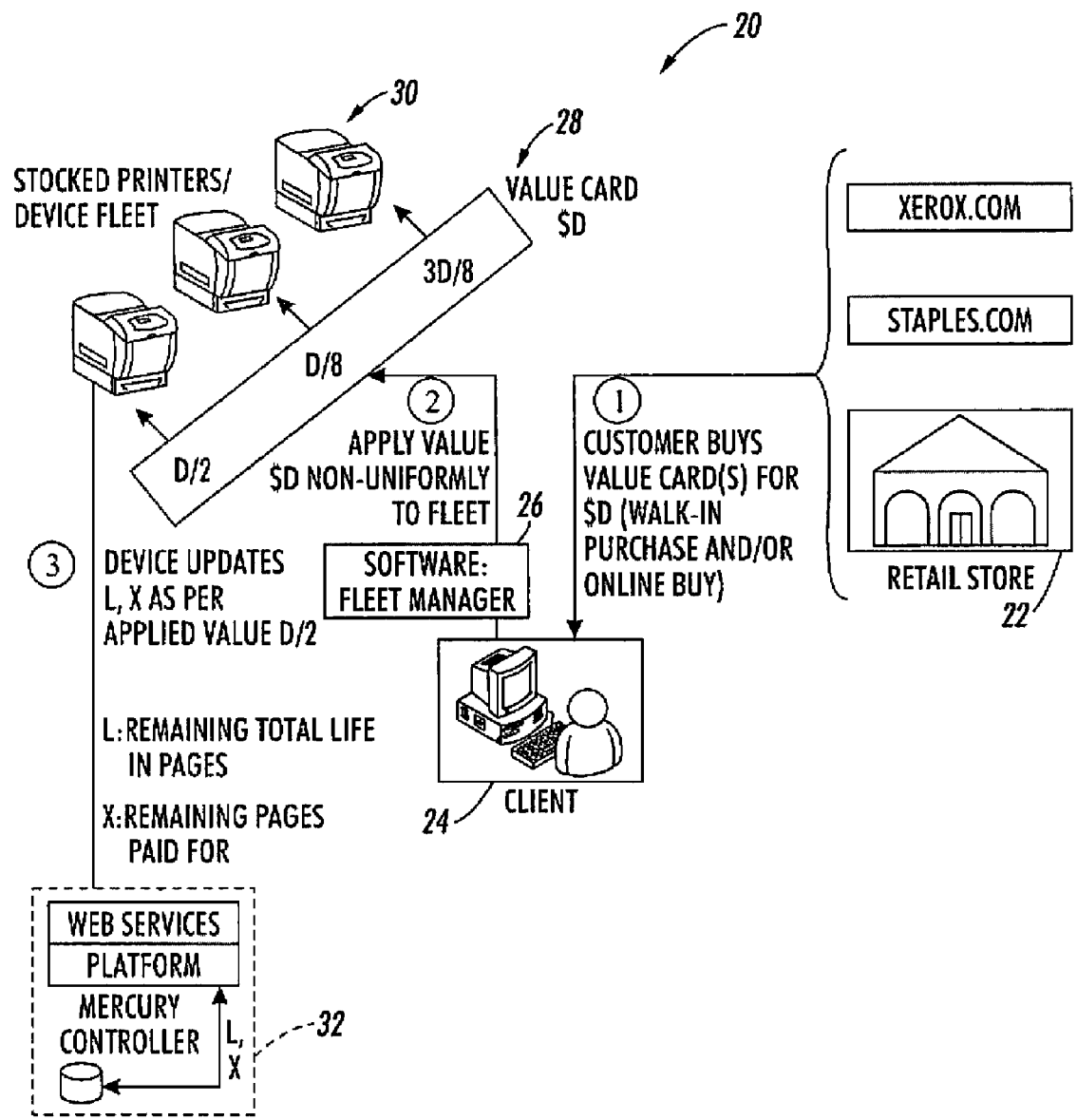
FIG. 2 is a schematic diagram of a "pay-as-you-go" purchase system, in accordance with a first embodiment of the present disclosure.

With reference to FIG. 1, there is presented a schematic diagram of a flexible and incremental payment process of the "pay-as-you-go" purchase system of FIG. 2, in accordance with the present disclosure. The payment system 10 includes a first purchase 12, a first authorization 14, a second authorization 16, and a third authorization 18.

FIG. 1 illustrates how a user purchases one or more MFDs via a first purchase 12 at, say, $250. Once the user completes the first purchase 12, the user receives a first value, $D1 on a prepaid card that relates to each of the MFDs purchased. In other words, each MFD has a first pre-set value associated with it or a fleet of MFDs may have a pre-set value associated with them. The first pre-set value is reduced each time a user requests a print job from the MFD. However, the user may purchase an additional prepaid card or deposit additional payments to the existing prepaid card in order to use the MFD or the plurality of MFDs.

For example, after a three month period, the user may complete a first authorization 14, where the user authorizes a second value, $D2, for one or more MFDs, as shown in FIG. 1. After a five-month period, the user may complete a second authorization 16, where the user authorizes a third value, $D3, for one or more MFDs. After a 7.5 month period, the user may complete a third authorization 18, where the user authorizes a fourth value, $D4, for one or more MFDs. In other words, after certain time periods, the user is permitted to add value (e.g., $D2, $D3, $D4) via a prepaid card to one or more desired MFDs. The user has the option to add value to any of the MFDs he/she desires. Thus, the prepaid card can be used for select MFDs based on usage considerations.

In an exemplary embodiment of the present disclosure, the system is referred to as a stocked printer scenario system (see FIG. 2). In such a scenario, the MFDs and their stock of consumables are transported to the customer in one-shot at the time of purchase. It is expected that the weight of the shipment with the consumables may not rise significantly to affect shipping cost, at least in comparison to the several one-way shipments and/or retailing costs incurred in the traditional case. Once the MFDs and consumables are available at the customer's location, the customer could activate more of the stocks by providing more payment, as described above with reference to FIG. 1.

The payment itself is in the form of a "value-card" that is purchased using conventional methods from any retail stores or websites or any type of service providers. Unless such payment is received, the MFDs would cease to function and/or degrade in functionality after the activated supplies on the MFD are depleted. The value in the prepaid card may be applied to more than one MFD such as those in an MFD fleet at the customer location. The ratio of such value application may be uniform or non-uniform as desired by the customer. In other words, a user may apply a portion of the funds to one MFD and apply other portions of the funds to other MFDs. For example, more of a card's value may be applied to a heavily used printer. Thus, the prepaid card can be used on a number of different MFDs in different financial increments.

With reference to FIG. 2, there is presented a schematic diagram of a "pay-as-you-go" purchase system, in accordance with a first embodiment of the present disclosure. The "pay-as-you-go" system 20 includes one or more retail stores 22, a client 24, a software application 26, a value card 28, a plurality of MFDs 30, and a platform 32.

FIG. 2 illustrates how the client 24 communicates with the plurality of MFDs 30 via a software application 26 in order to print one or more print jobs to the plurality of MFDs 30. In this exemplary embodiment of the present disclosure, it is assumed that the client 24 has by some means already acquired the value card 28 and is attempting to securely activate the value card 28 and apply it to one or more of the plurality of MFDs 30 in a customizable or proportionate manner.

In an initial step 0, the user buys $D worth of value (with $ value and embedded code) in the form of a value card 28 dispensed directly from a retail store 22, such as, but not limited to Staples®. Alternately, a virtual card may be supplied by vendors such as Xerox® on www.xerox.com or any other website. However, any type of service provider may supply physical value cards at their retail store or on the Internet via any type of Internet site.

In step 1, the customer opens a software application 26 referred to as a Fleet/Device Manager and keys in the number (s) provided on the value card 28. The card values are verified by, for example, www.Xerox.com or any other service provider providing such services, which sends confirmation to the software application 26 that the value card 28 has a certain amount of unapplied value.

In step 2, the Device/Fleet Manager or software application 26, which has knowledge of all the plurality of MFDs 30 in scope, applies the value within the value card 28 to the plurality of MFDs 30 themselves. At this point, the serial numbers of the plurality of MFDs 30, with the "pay-as-you-go" service enabled, are transmitted to an enterprise system (e.g., Xerox® through any Xerox® related, owned, operated website or any other service provider website) along with the fraction of $D that is requested to be applied to each device. This however does not limit the key pair exchange and storage process to occur at a time later than manufacturing. For example, this could occur when the MFD is first set up or configured.

At the time of manufacturing of the MFD, an MFD specific key-pair may have been generated and stored that can be used to enable a secure transaction between the customer, the manufacturer and/or service provider, and the plurality of MFDs 30, which will further be described with reference to FIG. 3. The enterprise information system, which is coupled with the manufacturing process, (i) identifies the MFD serial number specific key, (ii) signs the message containing the serial number, and (iii) sends it back to the device/fleet manager or software application 26. In addition, a specific fraction of the total value that could be applied to an MFD may also be part of the acknowledgement package.

In step 3, the device/fleet manager or software application 26 cannot directly use the signed package, since the plurality of MFDs 30 have other keys belonging to their specific pair. The device manager or software application 26 sends the signed packages associated with each MFD of the plurality of MFDs 30 along with the amount that is requested to be applied. The MFD of the plurality of MFDs 30 securely verifies that the request is valid and applies the change to the MFD.

In the present disclosure, an equivalent number of pages corresponding to $d_1\%$ of D may be applied to the first MFD. For example, if the price/page for monochrome is $m/page (ignoring color at this point), then $d_i\%$ of D/m pages is applied to the $i^{th}$ device. Note that sum(di) is a total of 100%. The argument is easily extended to a combination of color and black and white pages. Let $x_i$ be the number of pages that are bought by the $i^{th}$ device (after all associated conversion as above) in a given transaction. This $x_i$ is added to the variable x denoting remaining pages that can be printed in the controller of the $i^{th}$ device.

This process is executed for every selected device i belonging to the fleet and subscribed to the "pay-as-you-go" service. In this way, the value of a card 28 can be applied to a plurality of MFDs 30 in a secure manner either uniformly/proportionately or non-uniformly. The variable corresponding to remaining life-time (L) of each MFD is decremented by its corresponding $x_i$ during the transaction. If L is less than or equal to zero, the life-time of the MFD has expired and no more authorizations are possible. However, a user of the plurality of MFDs 30 may purchase more value cards 28 or may apply additional payments to the existing value card 28 in order to continue utilizing the plurality of MFDs 30.

While the above description with reference to FIG. 2 is a page based costing model, the value applied to the plurality of MFDs 30 may also be on the basis of a pixel based page coverage model. For example, nearly blank pages with very little pixel coverage may not count as a full page. It is possible to account for fractional pages, for example, during the printing of a given document, a series of documents or through an entire time-period. Under such local tracking, the decrements to already activated page counts may happen at a lower rate. Alternately, the value from a value card 28 may directly be applied on the basis of coverage per page. The cost model could also be a combination of page- and pixel-coverage-based techniques.

In step 4, once all the selected MFDs 30 are replenished, a confirmation is sent to the manufacturer and/or service provider to indicate that the card numbers are no longer valid. If the customer desires, a confirmation is printed or emailed directly from the manufacturer and/or service provider.

Figure 3:
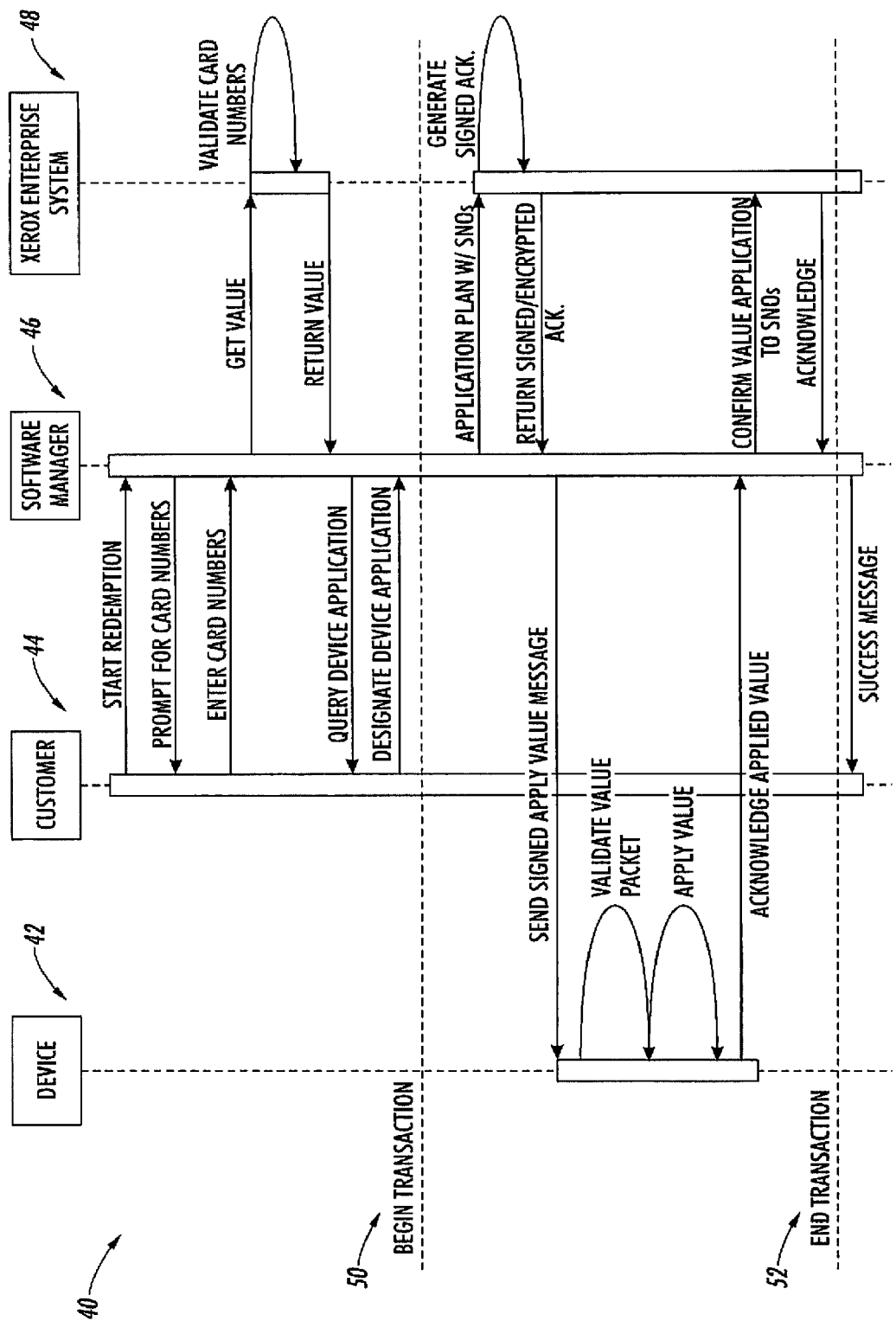
FIG. 3 is a sequence diagram for a plurality of transactions conducted in the "pay-as-you-go" purchase system of FIG. 2, in accordance with the present disclosure.

With reference to FIG. 3, there is presented a sequence diagram for a plurality of transactions conducted in the "pay-as-you-go" purchase system of FIG. 2, in accordance with the present disclosure. The sequence diagram 40 includes an MFD 42, a customer 44, a software manager 46, a remote server 48, a beginning transaction stage 50, and an ending transaction stage 52.

FIG. 3 illustrates a sequence diagram 40 of how such a transaction, as described with reference to FIG. 2, is implemented. FIG. 3 depicts a customer 44 who has access to a software manager 46 for determining access to an MFD 42. The software manager 46 may be electrically connected to a remote server 48, such as a Xerox Enterprise System. However, it is contemplated by one skilled in the art that the remote server may be owned, controlled, and/or operated by any of a number of different service providers.

The customer 44 sends a request to the software manager 46 for permission to access the MFD 42. The software manager 46 prompts the customer 44 for a card number. The customer 44 enters a card number, which is automatically sent to the software manager 46. Optionally, the software manager 46 electronically communicates with the remote server 48 to get the value of the card. The remote server 48 then returns a value of the card back to the software manager 46. The software manager 46 queries the device application from the customer 44. The customer 44 then designates the device application and informs the software manager 46 of such designation. This process completes the beginning transaction stage 50 of the sequence diagram 40.

The ending transaction stage 52 of the sequence diagram 40 commences as follows. Optionally, the software manager 46 sends an application plan with serial numbers (SNOs) of devices to the remote server 48. The remote server 48 generates a signed acknowledgment and returns the signed acknowledgment in an encrypted form back to the software manager 46. The software manager 46 sends the value message to the MFD 42. The MFD 42 validates the value packet and applies the value to the card. The MFD 42 then sends an acknowledgment to the software manager 46 that the value has been applied to the card. The software manager 46 sends a confirmation to the remote server 48 to confirm the value application to the SNOs. The remote server 48 sends a message to the software manager 46 that the confirmation has been acknowledged. The software manager 46 then informs the customer 44 that the message has been successfully received and that the customer is permitted to access the MFD 42.

Figure 4:
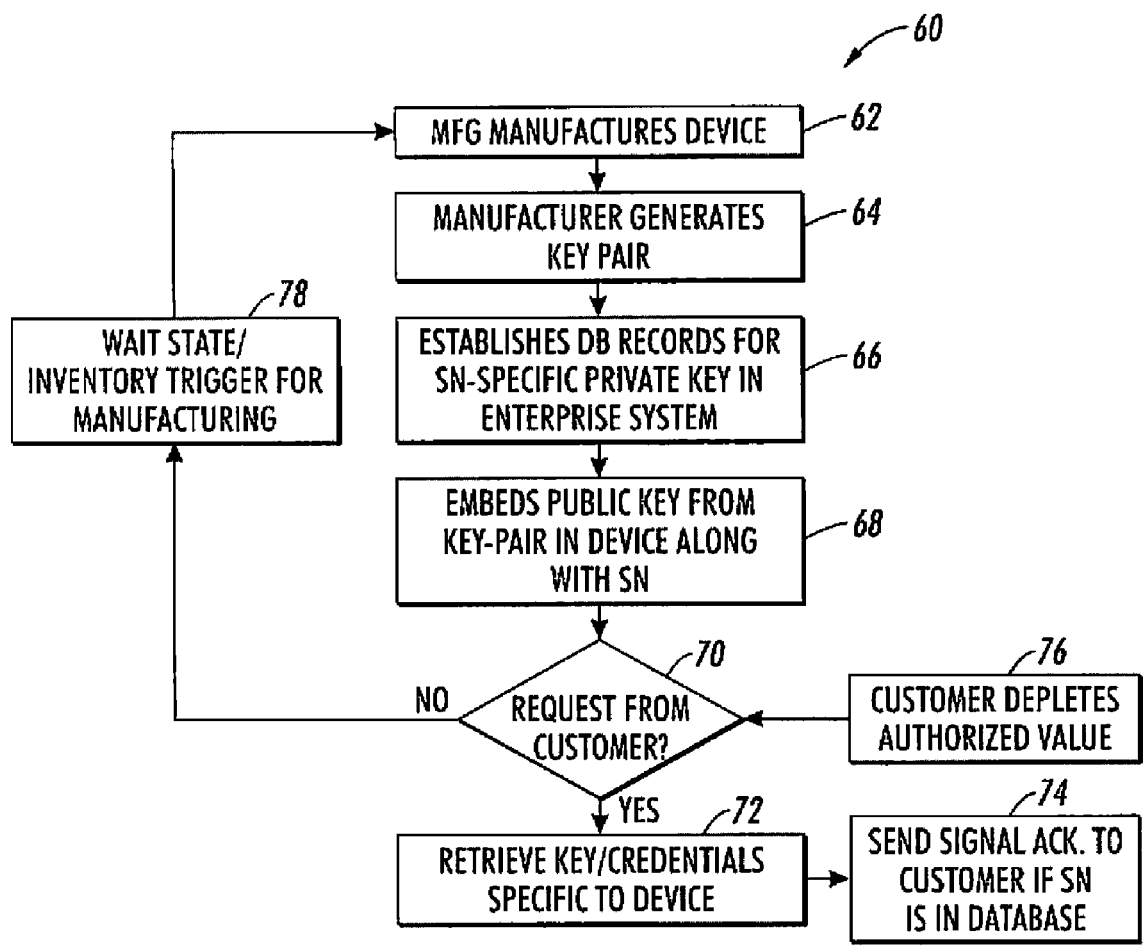
FIG. 4 is a flow chart illustrating a method for enabling printing to a plurality of multifunction devices (MFDs) via the "pay-as-you-go" purchase system of FIG. 2, in accordance with the present disclosure.

With reference to FIG. 4, there is presented a flow chart illustrating a method for enabling printing to a plurality of multifunction devices (MFDs) via the "pay-as-you-go" purchase system of FIG. 2, in accordance with the present disclosure. By way of example, it also shows how key-pairs are embedded in devices that are manufactured and when there is demand for a pay-as-you-go printer in the market. The flowchart 60 includes the following steps. In step 62, the manufacturer manufactures a device, such as an MFD. In step 64, the manufacturer generates a key pair. In step 66, database records are established for an SN-specific private key in the remote server 48 (i.e., the enterprise system). In step 68, the public key is embedded from the key-pair in the MFD along with the SN-specific key. In step 70, a decision is made whether the customer request should be enabled. If yes, then the process flows to step 72. If no, the process flows to step 78. In step 72, key/credentials specific to the MFD are retrieved. In step 74, a signed acknowledgment is sent to the customer if the SN-specific key is in the database. In step 76, the customer depletes the authorized value. In step 78, a wait state is triggered to halt/restart subsequent production, as a function of demand of MFDs, in the absence of which such MFDs in the field just proceed with the other loop in the flowchart, namely, that of reauthorization upon depletion of resources. The process then ends.

Figure 5:
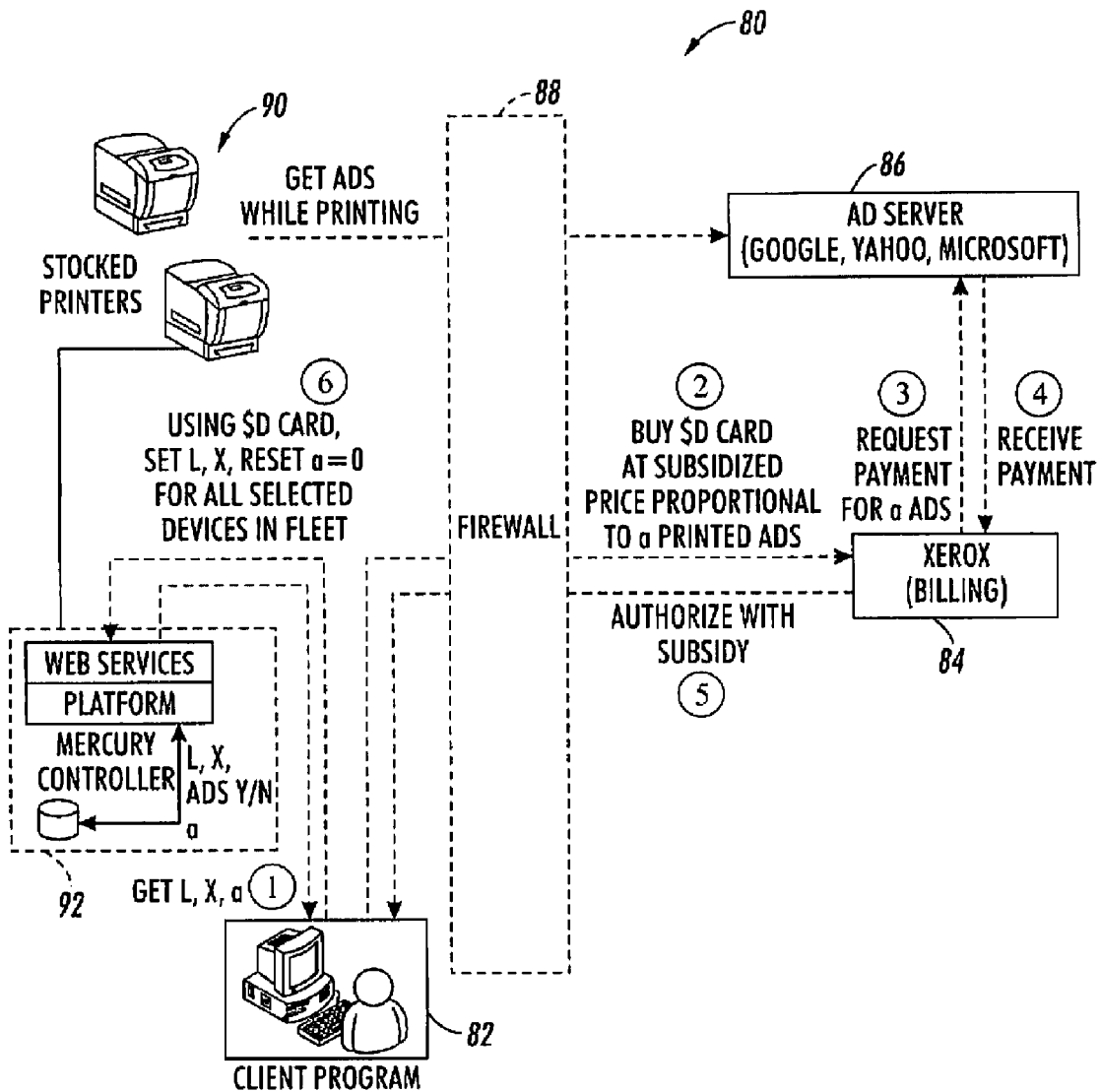
FIG. 5 is a schematic diagram of a "pay-as-you-go" purchase system including an advertisement deduction process, in accordance with a second embodiment of the present disclosure.

With reference to FIG. 5, there is presented a schematic diagram of a "pay-as-you-go" purchase system including an advertisement deduction process, in accordance with a second embodiment of the present disclosure. The "pay-as-you-go" system 80 includes a client program 82, a billing station 84, an advertisement server 86, a firewall 88, a plurality of MFDs 90, and a platform 92.

FIG. 5 illustrates how a "pay-as-you-go" purchase system is implemented in accordance with a second embodiment of the present disclosure. The client program 82 is in electrical communication with a firewall 88 that directly communicates with a billing station 84 and an advertisement server 86. The client program 82 is permitted to access the plurality of MFDs 90 via a platform 92 when it has been determined that access is permitted.

In the first embodiment of the present disclosure, described with reference to FIG. 1, the customer pays for the complete dollar value of the card that was applied to a fleet of MFDs. However, in the second embodiment of the present disclosure, it is contemplated that there may be cases, especially in places such as airports, museums, train stations, etc. where printing using a fleet of MFDs may be subsidized by advertisements.

In FIG. 5, a case is illustrated where the MFD keeps track of one or more advertisements obtained and printed, and during the time of the next application of value from the card, a discount is provided. The second embodiment improves upon the stocked printer scenario shown in FIGS. 1-4. The extra steps involved in the process described in FIG. 5 would be a) to track the type and quantity of advertisements printed by every MFD in the fleet of MFDs, b) to get a payment from the advertisement aggregator for the ads printed, and c) to give a discount on the actual value of the card that is authorized as in the aforementioned usage case. Advertisements are printed at the discretion of the fleet of MFDs owner/operator, and on specified regions on the paper used by the fleet of MFDs. The customer does not pay for any ad-related expenses. Additionally, the fleet of MFDs may have extra fields to track the ads that are printed.

The advantage of such an implementation, as described in FIG. 5, is that ads may subsidize printing on demand and no special purpose stationary (e.g., the tickets at airports, stations, museums with pre-printed ads, etc.) is necessary. Regular paper can be used and the customer reaps the benefits based on on-demand contextual advertisements.

Moreover, the value card may be purchased using any conventional means. The discounts may be realized through the fleet-manager application which is operated from inside the customer's network in connection with any remote server provided by any service provider. For example, on noticing that the fleet of MFDs has printed a certain volume of advertisements, the value $D in the card may be increased after the application communicates to and authorizes additional value (e.g., proportional to printed ad-volume over the previous time-period) from the remote server provided by any service provider.

The present disclosure proposes an alternative method that takes advantage of "pay-as-you-go" systems relating to printing jobs of MFDs in order to make the process of printing simple and as streamlined as possible to provide for an efficient user experience. The concept of using a "pay-as-you-go" system is a general concept in that it can be used for applications other than printers by any service provider. For example, service providers could use any type of printer and/or MFD and/or electronic device to achieve the desired results of the present disclosure. Also the printing system of the present disclosure makes it easier for information technology (IT) groups and/or service providers to manage the printing environment for their clients.

In summary, the present disclosure introduces a system and method for using a single MFD or a fleet of MFDs while making small, flexible, payments relating to the amount of consumables required without any contractual obligations. The proposed method has the following advantages: (1) Aforementioned contract-free flexible payments at the time of the owner's choosing to account for seasonal demands as foreseen by the owner and/or user of the MFD or the fleet of MFDs; (2) Practically no shipping of consumables (and hence no waiting for the toner to arrive) as the MFD is pre-supplied with consumables along with the initial shipment; and (3) No explicit need to monitor (and inform the manufacturer of) the levels of consumables, causing a communication between the device and the manufacturer across the firewall, unless the customer so desires. All these advantages of the present disclosure may be realized by any service provider.

A service provider can be any entity that develops, offers, controls, manages, owns, alters and/or sells software and/or hardware products. A service provider can be any entity that performs one or more tasks on one or more pre-existing MFDs, which may or may not be controlled or owned by the service provider. For example, the entity can offer a service with an existing software package and/or with any type of existing Internet-based service through the Internet. In other words, a service provider need not own or provide the MFDs.

The MFDs may be owned or provided by any third party not related or associated with the service provider. In the present disclosure, it is contemplated that the entity (such as a service provider) can offer any type of service and/or product to optimize pre-existing, pre-owned MFDs by referring potential customers to an Internet website or a store that may or may not be associated with printing-related services and/or products. The term "entity" can refer to anything that may exist as a discrete and/or distinct unit that owns, operates, manages, and/or controls one or more of a plurality of machines (such as MFDs). For example, the term "entity" may include the term "company."

The present disclosure also includes as an additional embodiment a computer-readable medium which stores programmable instructions configured for being executed by at least one processor for performing the methods described herein according to the present disclosure. The computer-readable medium can include flash memory, CD-ROM, a hard drive, etc.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A printing system comprising:
   a plurality of multifunctional printing devices, said plurality of multifunctional printing devices being operatively associated with at least one controller and each one of said plurality of multifunctional printing devices having a preset amount of preloaded consumables at a time of initial use; and
   a software application for enabling at least one user to access said plurality of multifunctional printing devices, said software application being configured to receive information from a prepaid card, the information including a financial value relating to usage of some of the preset amount of preloaded consumables in said plurality of multifunctional printing devices, and the prepaid card being used (i) for activating said software application and (ii) for selectively authorizing access of the at least one user to the at least one controller of said plurality of multifunctional printing devices;
   wherein the financial value of the prepaid card is applied by the at least one user across said plurality of multifunctional printing devices in any desired uniform or non-uniform financial proportions in accordance with usage determinations of the at least one user; and
   wherein the at least one user is enabled, through use of the prepaid card, to pay for access to said plurality of multifunctional printing devices in time staggered installments without pre-established contractual obligations.

2. The system according to claim 1, wherein the prepaid card is a virtual card for usage across the plurality of multifunctional printing devices.

3. The system according to claim 1, wherein a selected action by the at least one user at one or more of said plurality of multifunctional printing devices causes one of the time staggered installments to be discounted.

4. The system according to claim 3, wherein said selected action includes printing selected advertisements on one or more of said plurality of multifunctional printing devices.

5. The system according to claim 1, wherein said software application verifies authorization capabilities with respect to the at least one user by transmitting a serial number specific acknowledgment to the at least one user and determining whether the serial number exists in a database.

6. The system according to claim 1, wherein the software application verifies availability of prepaid funds.

7. The system according to claim 1, wherein the software application includes a counter function for both incrementing a count when a first print quantity is paid for by the at least one user and decrementing the count when a second print quantity is obtained by the at least one user.

8. The system according to claim 7, wherein the print quantity varies as a function of pages.

9. The system according to claim 7, wherein the print quantity varies as a function of picture elements.

10. The system according to claim 7, wherein the count is incremented when the at least one user prints one or more selected advertisements at one or more of said plurality of multifunctional printing devices.

11. The system according to claim 7, wherein the prepaid card is automatically inactivated when the count is decremented below a selected value.

12. The system according to claim 1, wherein the application software is in electrical communication with a server in order to verify authorization and provide the server with information relating to financial values of prepaid cards.

13. The system according to claim 1, wherein the software application enables the at least one user to access said plurality of multifunctional printing devices according to a page coverage function in which a page counter counts actual printed volume by pages or page coverage by pixels deposited to measure usage for one of the multifunctional printing devices, and wherein the software application accounts for fractional pages with very little pixel coverage by incrementing the page counter where fractions add up to a full page.

14. A method of operating a printing system, comprising:
   operatively associating a plurality of multifunctional printing devices with at least one controller, wherein each one of the multifunctional printing devices has a preset amount of preloaded consumables at a time of initial use;
   enabling at least one user, with a software application, to access at least one of the plurality of multifunctional printing devices with a prepaid card, the prepaid card including a financial value relating to usage of some of the preset amount of preloaded consumables in said plurality of multifunctional printing devices;
   using the prepaid card to (1) activate the software application, (2) provide the at least one user with access to the at least one controller of the plurality of multifunctional printing devices, and (3) pay for access to the plurality of multifunctional printing devices in time staggered installments without pre-established contractual obligations; and
   applying the financial value of the prepaid card across the plurality of multifunctional printing devices in any desired uniform or non-uniform financial proportions in accordance with usage determinations of the at least one user.

15. The method according to claim 14, wherein the prepaid card is a virtual card for usage across the plurality of multifunctional printing devices.

16. The method according to claim 14, wherein a selected action by the at least one user at one or more of said plurality of multifunctional printing devices causes one of the time staggered installments to be discounted.

17. The method according to claim 14, further comprising:
causing one of the time staggered installments to be discounted in response to a selected action being performed by the at least one user at one or more of the plurality of multifunctional printing devices.

18. The method according to claim 16, wherein said selected action includes printing selected advertisements on one or more of the plurality of multifunctional printing devices.

19. The method according to claim 14, further comprising verifying authorization of the at least one user to access the plurality of multifunctional printing devices by matching a user provided number with a pre-approved number in a database.

20. The method according to claim 14, wherein the software application verifies availability of prepaid funds.

21. The method of claim 14, further comprising:
verifying availability of prepaid funds.

22. The method according to claim 14, further comprising:
incrementing a count when a first print quantity is paid for by the at least one user; and
decrementing the count when a second print quantity is obtained by the at least one user.

23. The method according to claim 22, wherein the print quantity varies as a function of pages.

24. The system according to claim 22, wherein the print quantity varies as a function of picture elements.

25. The method according to claim 22, wherein the count is incremented when the at least one user prints one or more selected advertisements at one or more of said plurality of multifunctional printing devices.

26. The method according to claim 22, further comprising:
automatically inactivating the prepaid card when the count is decremented below a selected value.

27. The method according to claim 14, wherein the application software is in electrical communication with a server in order to verify authorization and provide the server with information relating to financial values of prepaid cards.

28. The method according to claim 14, further comprising:
enabling the at least one user to access said plurality of multifunctional printing devices according to a page coverage function using a page counter to count actual printed volume by pages or page coverage by pixels deposited to measure usage for a given one of the multifunctional printing devices; and accounting for fractional pages with very little pixel coverage by incrementing the page counter where fractions add up to a full page.

29. The method according to claim 14, further comprising:
defining and estimating a lifetime's supply of a given consumable that is shipped in a first or original consignment.

30. A computer-readable medium storing programmable instructions configured for being executed by at least one processor for enabling printing capabilities, the method comprising the steps of:
enabling a plurality of multifunctional printing devices to be operatively associated with at least one controller where each one of said plurality of multifunctional printing devices includes a preset amount of preloaded consumables at a time of initial use; and
enabling at least one user to access said plurality of multifunctional printing devices via a software application, said software application being configured to receive information from a prepaid card, the information including a financial value relating to usage of some of the preset amount of preloaded consumables in said plurality of multifunctional printing devices, and the prepaid card being used (i) for activating said software application and (ii) for selectively authorizing access of the at least one user to the at least one controller of said plurality of multifunctional printing devices;
wherein the financial value of the prepaid card is applied by the at least one user across said plurality of multifunctional printing devices in any desired uniform or non-uniform financial proportions in accordance with usage determinations of the at least one user; and
wherein the at least one user is enabled, through use of the prepaid card, to pay for access to said plurality of multifunctional printing devices in time staggered installments without pre-established contractual obligations.

* * * * *